United States Patent
Beauchesne

(10) Patent No.: US 9,930,053 B2
(45) Date of Patent: Mar. 27, 2018

(54) METHOD AND SYSTEM FOR DETECTING BOT BEHAVIOR

(71) Applicant: Vectra Networks, Inc., San Jose, CA (US)

(72) Inventor: Nicolas Beauchesne, Miami Beach, FL (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,125

(22) Filed: Mar. 10, 2015

(65) Prior Publication Data
US 2015/0264068 A1    Sep. 17, 2015

Related U.S. Application Data

(60) Provisional application No. 61/951,479, filed on Mar. 11, 2014.

(51) Int. Cl.
*H04L 29/06*    (2006.01)
*G06F 21/56*    (2013.01)

(52) U.S. Cl.
CPC ........ *H04L 63/1416* (2013.01); *G06F 21/561* (2013.01); *G06F 2221/034* (2013.01); *H04L 2463/144* (2013.01)

(58) Field of Classification Search
CPC .... H04L 63/1416; H04L 43/04; G06F 21/561
See application file for complete search history.

(56) References Cited

U.S. PATENT DOCUMENTS 8,555,388 B1 * 10/2013 Wang .................. H04L 63/1416
                                                                709/245
2003/0236652 A1   12/2003 Scherrer et al.
2008/0028463 A1 *  1/2008 Dagon .............. H04L 29/12066
                                                                726/22

(Continued)

FOREIGN PATENT DOCUMENTS

EP          2247064 A2    11/2010

OTHER PUBLICATIONS

Ji et al., BotCatch: A Behavior and Signature Correlated Bot Detection Approach, High Performance Computing and Communications & 2013 IEEE International Conference on Embedded and Ubiquitous Computing (HPCC_EUC), 2013 IEEE 10th International Conference on, Nov. 2013.*

(Continued)

*Primary Examiner* — Luu Pham
*Assistant Examiner* — Harvey Cohen
(74) *Attorney, Agent, or Firm* — Vista IP Law Group, LLP

(57) ABSTRACT

A bot detection engine to determine whether hosts in an organization's network are performing bot-related activities is disclosed. A bot detection engine can receive network traffic between hosts in a network, and/or between hosts across several networks. The bot engine may parse the network traffic into session datasets and discard the session datasets that were not initiated by hosts in a given network. The session datasets may be analyzed and state data may be accumulated. The state data may correspond to actions performed by the hosts, such as requesting a website or clicking ads, or requesting content within the website (e.g. clicking on a image which forms a HTTP request/response transaction for the image file).

21 Claims, 10 Drawing Sheets

(56) References Cited

U.S. PATENT DOCUMENTS

| | | | |
|---|---|---|---|
| 2009/0172815 A1 | 7/2009 | Gu et al. | |
| 2010/0162396 A1* | 6/2010 | Liu | G06F 21/566 |
| | | | 726/23 |
| 2011/0153811 A1* | 6/2011 | Jeong | H04L 63/14 |
| | | | 709/224 |
| 2011/0154492 A1* | 6/2011 | Jeong | H04L 63/1416 |
| | | | 726/23 |
| 2011/0179164 A1* | 7/2011 | Memon | H04L 63/1441 |
| | | | 709/224 |
| 2012/0151033 A1* | 6/2012 | Baliga | H04L 63/1425 |
| | | | 709/224 |
| 2012/0174221 A1* | 7/2012 | Han | H04L 63/1458 |
| | | | 726/23 |
| 2013/0198203 A1 | 8/2013 | Bates et al. | |
| 2013/0291107 A1* | 10/2013 | Marck | G06F 21/316 |
| | | | 726/23 |
| 2013/0347114 A1* | 12/2013 | Altman | H04L 63/1425 |
| | | | 726/24 |
| 2014/0344912 A1* | 11/2014 | Chapman, II | H04L 63/1441 |
| | | | 726/11 |
| 2015/0135315 A1* | 5/2015 | Ahmed | G06F 21/552 |
| | | | 726/23 |

OTHER PUBLICATIONS

Etemad et al, Real-time Botnet command and control characterization at the host level, Telecommunications (IST), 2012 Sixth International Symposium on, Nov. 2012.*

Tegeler et al, BotFinder: finding bots in network traffic without deep packet inspection, CoNEXT '12 Proceedings of the 8th international conference on Emerging networking experiments and technologies, pp. 349-360 , Dec. 2012.*

Lu et al, Automatic discovery of botnet communities on large-scale communication networks, Proceeding ASIACCS '09 Proceedings of the 4th International Symposium on Information, Computer, and Communications Security, pp. 1-10.*

Search Report and Written Opinion dated Jun. 24, 2015 for PCT Appln. No. PCT/US15/19785.

PCT International Preliminary Report on Patentability for International Appln. No. PCT/US2015/019785, Applicant Vectra Networks, Inc., et al., dated Sep. 22, 2016 (7 pages).

Extended European Search Report dated Oct. 10, 2017 for EP Appln. No. 15761712.7.

* cited by examiner

METHOD AND SYSTEM FOR DETECTING BOT BEHAVIOR

CROSS-REFERENCE TO RELATED APPLICATION(S)

The present application claims the benefit of U.S. Provisional Application Ser. No. 61/951,479, filed on Mar. 11, 2014, titled "METHOD AND SYSTEM TO IDENTIFY HOST THAT IS UNDER CONTROL OF AN OUTSIDE ENTITY", the content of the aforementioned application is hereby incorporated by reference in its entirety.

BACKGROUND

In recent years, it has become increasingly difficult to detect malicious activity carried on networks. The sophistication of intrusions has increased substantially, as entities with greater resources, such as organized crime and state actors, have directed resources towards developing new modes of attacking networks.

One pernicious type of intrusion pertains to the situation when an outside entity takes control of a host at a given company or organization (e.g. a computer within a company's network). When this happens, the host can be controlled and used as a source of attacks against other targets inside and outside of the company's network. What makes this situation particularly difficult to identify is that the attacks may not be directed at targets actually owned by the same company that owns the host, but instead may be directed to targets that are outside of the company or organization.

For instance, one type of control that is commonly implemented among those with malicious intent in the digital world, occurs through use of a centralized controller, referred to as a "bot herder", that exerts control over a number of infected hosts, collectively called a "botnet", where each infected host is called a "bot". One of the factors that makes botnet activity difficult to detect is the lack of effect or disturbance attributable to each bot. For instance, a bot herder in control of 10,000 bots may direct one bot to click ads on a given website as part of a click-fraud scheme. Or in other situations the bots may be directed to contact the same target server at the same point in time as part of a distributed-denial-of-service (DDoS) attack. Although potentially harmful in full, in singular cases each bot's activity (e.g. clicking on ads, accessing a website) appears innocuous to the security systems inside the networks in which they reside. As such, the bot activity blends in with normal network traffic and renders conventional security systems ineffective.

As is evident, there is a great need for approaches that effectively and efficiently identify scenarios where an outside entity takes control of a host, e.g., botnet attacks.

SUMMARY

In some embodiments, a bot detection engine may be implemented to receive (e.g. intercept) and copy network traffic between hosts in a network, and/or between hosts across several networks. In some embodiments, the bot detection engine may parse the network traffic into session datasets and discard the session datasets that were not initiated by hosts in a given network (e.g. discard session datasets unless they involve an internal host initiating connections to a machine outside the network). The session datasets may then be analyzed and state data may be accumulated. The state data may correspond to actions performed by the hosts, such as requesting a website or clicking ads, or requesting content within the website (e.g. clicking on an image which forms a HTTP request/response transaction for the image file). In some embodiments, the state data is examined across a time window, such that state data older than a time limit is discarded. In some embodiments, if state data surpasses a threshold, host score data may be generated that can indicate that the corroding hosts are bots, or partaking in bot activity as orchestrated by a bot herder or malicious user (e.g. external computing entity). In contrast to conventional approaches that detect whether a given network or computer is being attacked, the disclosed embodiments can determine whether an organization's network is attacking others.

Other additional objects, features, and advantages of the invention are described in the detailed description, figures, and claims.

DETAILED DESCRIPTION

Various embodiments of the invention are directed to a method, system, and computer program product for detecting network intrusions. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, the present invention encompasses present and future known equivalents to the components referred to herein by way of illustration.

Before describing the examples illustratively depicted in the several figures, a general introduction is provided to further understanding. In some embodiments, a bot detection engine may be implemented to receive (e.g. intercept) and copy network traffic between hosts in a network, and/or between hosts across several networks. In some embodiments, the bot engine may parse the network traffic into session datasets and discard the session datasets that were not initiated by hosts in a given network (e.g. discard session datasets initiated by external hosts). The session datasets may then be analyzed and state data may be accumulated. The state data may correspond to actions performed by the hosts, such as requesting a website or clicking ads, or requesting content within the website (e.g. clicking on a image which forms a HTTP request/response transaction for the image file). In some embodiments, the state data is examined across a time window, such that state data older than a time limit is discarded. In some embodiments, if state data surpasses a threshold, host score data may be generated that can indicate that the corresponding hosts are bots, or partaking in bot activity as orchestrated by a bot herder or malicious user (e.g. external computing entity).

Figure 1A:
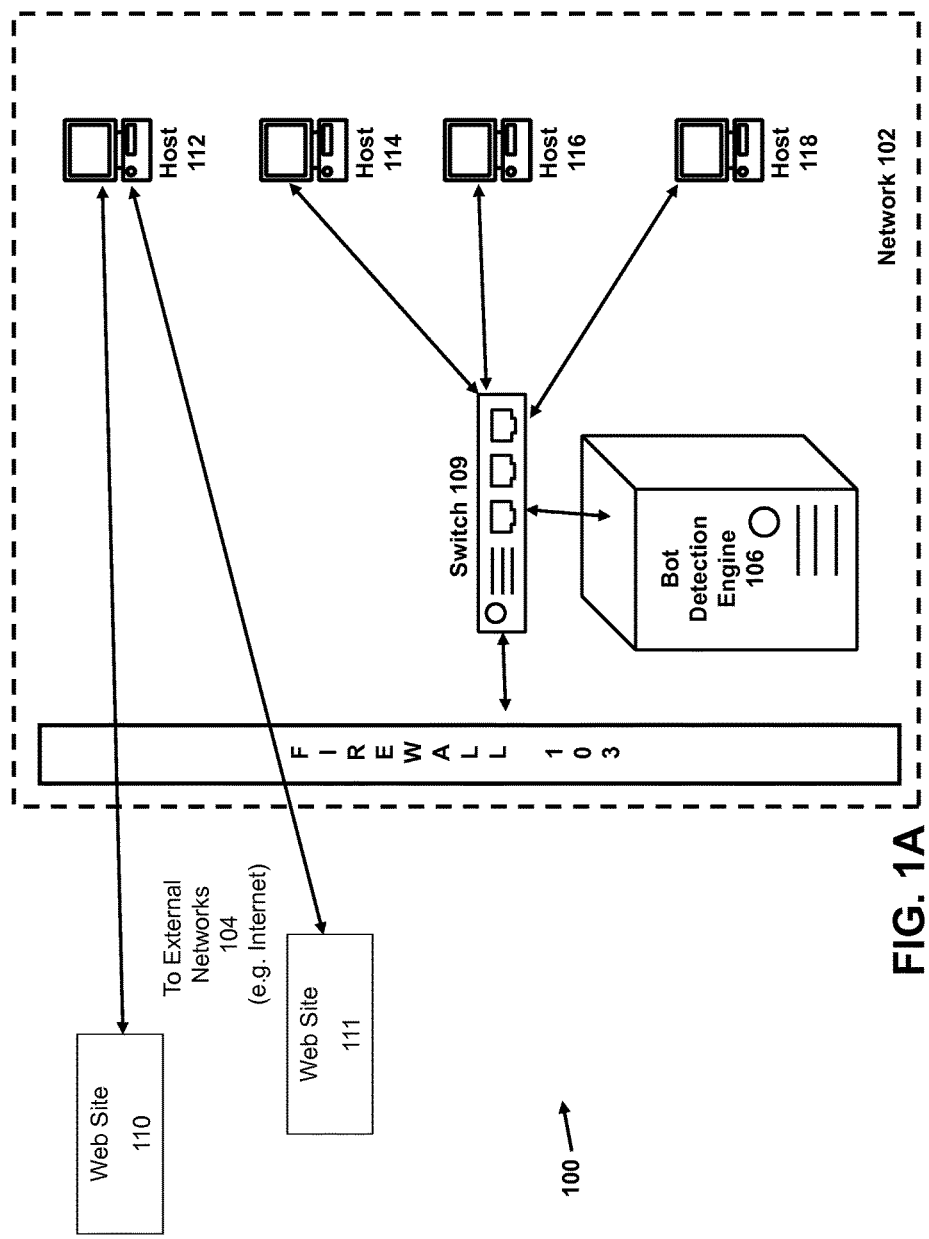
FIGS. 1A-B illustrates an example environment in which a bot detection engine may be implemented to perform pattern detection schemes, as according to some embodiments.

FIG. 1A illustrates an example environment 100 in which a bot detection engine 106 may be implemented to perform pattern detection schemes, as according to some embodiments. There, an example network 102 comprises one or more hosts (e.g. assets, clients, computing entities), such as host entities 112, 114, 116, and 118, that may communicate with one another through one or more network devices, such as a network switch 109. The network 102 may communicate with external networks 104 through one or more network border devices as are known in the art, such as a firewall 103. For instance, host 112 may contact external website 110 and/or external website 111 through network protocols such as TCP/IP, involving HTTP requests and responses. Accordingly, as illustrated in this example, the hosts are protected in the network 102.

In some embodiments, the bot detection engine 106 enables network traffic to be analyzed, parsed into session datasets, and behavior (e.g. pattern) detection analysis performed on hosts in the network 102. In some embodiments, as illustrated, the bot detection engine 106 may tap (e.g. TAP/SPAN) the network switch 109 to passively analyze the network traffic in a way that does not harm or slow down the network (e.g. by creating a copy of the network traffic for analysis). In some embodiments, the bot detection engine is an external module that is coupled to the switch 109. In some embodiments, the intrusion detection engine may be directly integrated into network components, such as a switch 109 or a firewall 103. In some further embodiments the bot detection engine may be integrated into one or more hosts (e.g. 118) in a distributed fashion (e.g. each host may have its own set instructions, the hosts collectively agree to follow or adhere to the instruction to collect information and report information to one another or the database to collectively work as a bot detection engine). Still in some embodiments, the bot detection engine may be integrated into a single host (e.g. host 112) that performs bot detection engine actions for the network 102.

Figure 1B:
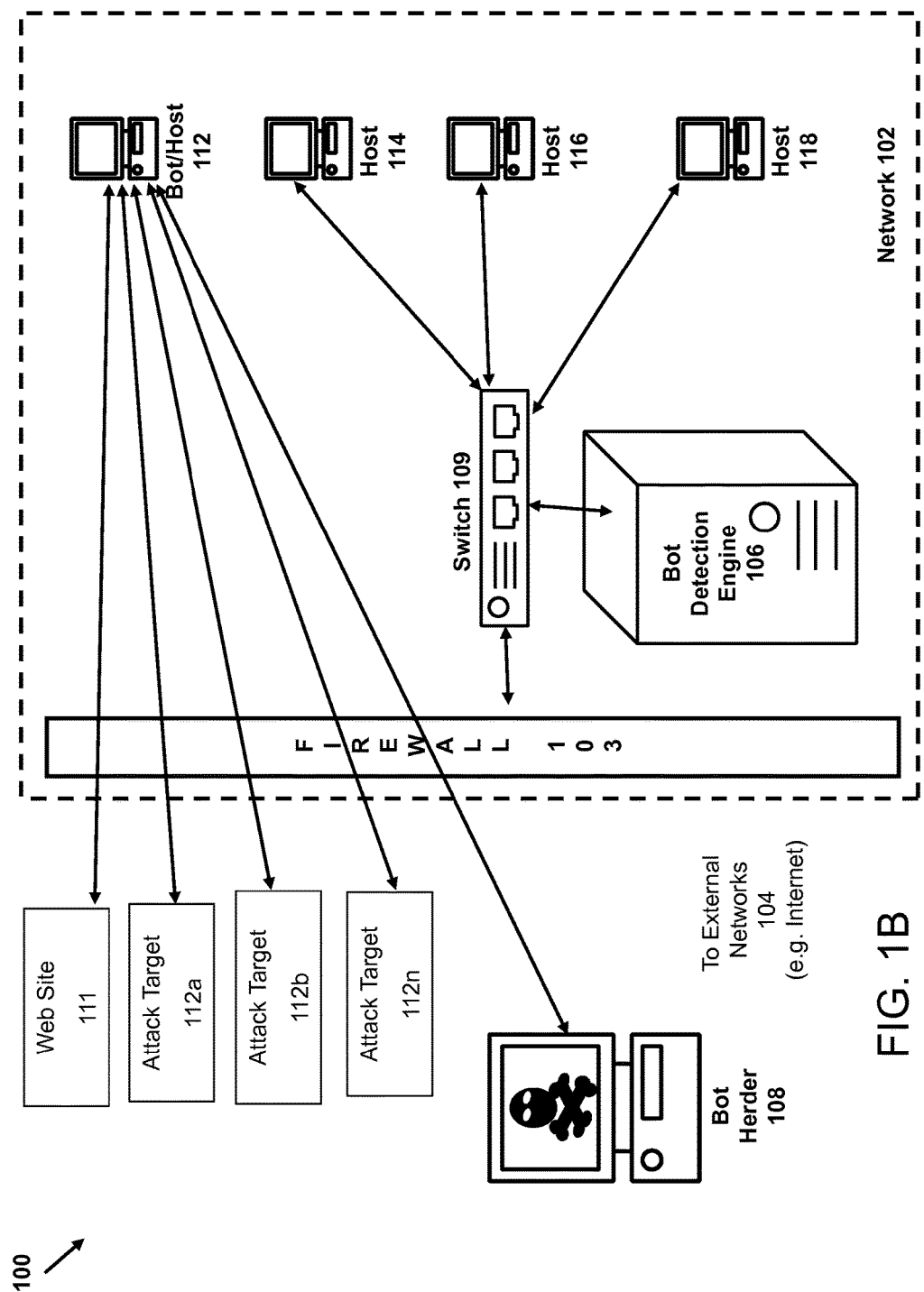

FIG. 1B illustrates an example environment in which a bot detection engine 106 implements pattern detection schemes, as according to some embodiments. As illustrated, an attacking entity, e.g. bot herder 108, has bypassed the network security devices, e.g. firewall 103, and infected a host, e.g. bot/host 112 or host 112 was infected while outside the network and was physically transported to the inside of the network. In some embodiments, the company network 102 may cover multiple physical locations or may be limited to a single place like a campus network or a data center. In the company network 102, there may be a number of uninfected hosts, e.g. host 114, host 116, host 118. Typically, the uninfected hosts are not running software installed without the direct knowledge of the end user of the host or the IT organization for the company that owns both the network and the machine (host) connected to it.

The company network 102 may also include one or more bots (infected hosts), e.g. bot/host 112. Typically, the infected hosts are running software installed without the direct knowledge of the end user of the host or the IT organization for the company that owns both the network and the machine connected to it. In some embodiments, different forms of infection (e.g. infections from network attack), such as viruses, trojans, or worms, that infect the bots display different types of activity patterns. As described in further detail below, the bot detection engine 106 can be tuned using detection schemes to detect infection activity. As one of ordinary skill in the art appreciates, the manner in which the bot became infected (e.g., phishing, watering hole, search engine poisoning, etc.) is not limiting as to the solution described herein. In this way, a detection scheme can be implemented that is flexible and adaptable to different network attacks and infections.

In some embodiments, a bot herder 108 may make the infected host perform activities not known or desired by the company that owns the bot/host 112. For instance, as according to some embodiments, the bot herder 108 may generate revenue (e.g. ill-gained revenue) by instructing the infected host 112 to undertake activities that generate money. That is, the bot/host 112 is not infected in an effort to attack the customer network in which the infected host resides, but rather by either attacking others or taking advantage of otherwise legitimate services found on the internet (e.g. "monetization" behaviors). For instance, in some embodiments, this may involve getting the bot to perform a high volume of transactions to the bot herder's benefit; that is, the value of the bot to the bot herder is that a bot is a "free" computer, using "free" network connectivity, with a flexible-use benign identity that the bot/host provides as a front for the entity (e.g. person, computing entity) controlling the bot herder. In some embodiments, high volume behavior that makes a small amount of money per transaction may include sending spam e-mails.

In some embodiments, high volume behavior that makes a small amount of money per transaction may include participating in denial-of-service (DoS) attacks. In some embodiments, high volume behavior that makes a small amount of money per transaction may include undertaking click fraud in the context of online advertising networks, search engine optimization (SEO) on behalf of a client, social media optimization (SMO) on behalf of a client. In some embodiments, high volume behavior that makes a small amount of money per transaction may include scanning for open ports across the internet in search of new vulnerabilities that allow the botnet to spread further.

In some embodiments, there may be web sites and other services (e.g. website 111) on the Internet that are not being attacked by the particular host (at least not during the window of time during which detection is implemented). In these cases, the bot may legitimately contact such web sites or services as the bot is not absolutely being run by the bot herder, but is also still performing the legitimate tasks requested by the bot's local user or the programs which the IT department has installed on the bot.

In some embodiments, attack targets 112a-112n, represent systems (e.g. external systems across the Internet) that the bot herder instructs the bot to contact in some way (e.g. click fraud, scanning). As these systems are legitimate services on the Internet, there may not be an effective defense to prevent uninfected hosts inside the same company network (e.g. 102) or on other company networks from connecting to these attack targets. In some cases, the number of attack targets could easily number into thousands or tens of thousands of systems.

As explained, in some embodiments the company network is protected by a firewall 103 that generally prevents external hosts (e.g. a computer associated with website 111) from being able to initiate connections into the company network (e.g. an initial communication from website 111 to host 112 is forbidden/stopped by firewall 103). However, border security devices such as the firewall 103 do not typically prevent internal hosts from connecting to external systems using approved protocols such as HTTP (HyperText Transfer Protocol) and DNS (Domain Name System). That is, while a firewall attempts to prevent an external attacker from directly infecting a host inside the company network, if the internal host can be coaxed into contacting an external system, the firewall will not prevent the response from the external system from infecting the internal host. In some embodiments, in campus networks for instance, the firewall may also implement NAT (Network Address Translation) functionality that hides the internal IP address of a host when it is communicating with outside systems.

In some embodiments, the detection system in the company network will detect that a host inside the network is a bot by observing the traffic from internal hosts to the Internet. The detection system can be located in the company network in such a way that it sees the host traffic to the Internet and sees that traffic before NAT changes the internal IP addresses of each internal host's traffic. Generally, efforts to detect and prevent e-mail spam, DoS, advertising click fraud, SEO manipulation, SMO manipulation, etc. have been focused on protecting the victims of this fraud.

However, the bot detection engine avoids reliance on traditional mechanisms that may be blind to ill-motivated communications initiated from inside a network (e.g. bot behavior). In contrast, the bot detection engine identifies bot behavior, in some embodiments, by detecting the volume and variety of high volume monetization behaviors. The detection system approaches disclosed herein use the relatively small-scale presence of these bot behaviors in aggregation as an indicator that the host is a bot and thus an unwilling accomplice on attacks on one or more websites or services.

Figure 2:
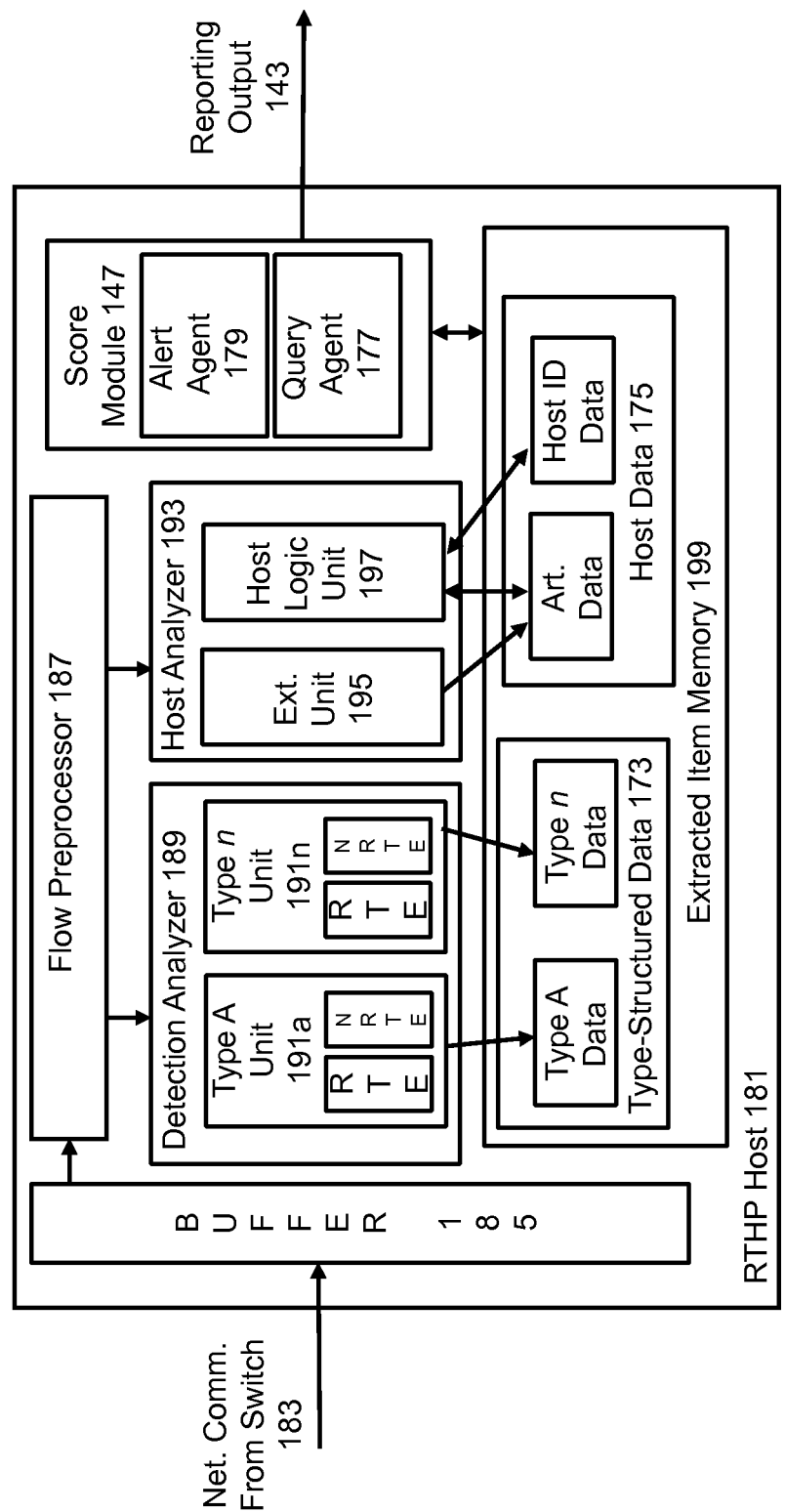
FIG. 2 illustrates an example detection system in which the bot detection approaches disclosed may be implemented.

FIG. 2 illustrates an example system in which the approaches disclosed may be implemented. FIG. 2 shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191a may be designed for detecting relay communication attacks; for every type of relay communication detected, detection unit Type A 191a may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in, U.S. patent application Ser. No. 14/643,931, entitled "A system and method for detecting intrusions through real-time processing of traffic with extensive historical perspective", filed on even date herewith, which is hereby incorporated by reference in its entirety.

Figure 3:
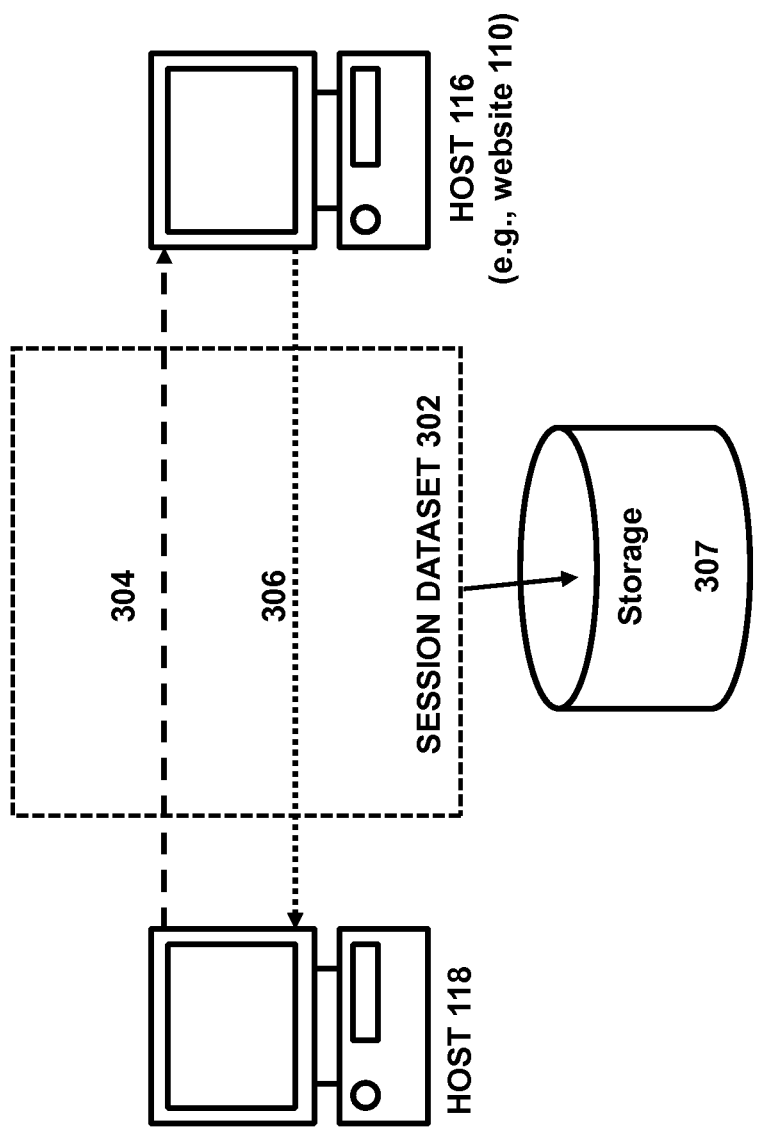
FIG. 3 illustrates a session dataset comprising one or more unidirectional flows between two computing entities, as according to some embodiments.

FIG. 3 illustrates a session dataset comprising one or more unidirectional flows between two computing entities, as according to some embodiments. As mentioned, in some embodiments the bot detection engine may perform bot detection on network communications in a passive manner that does not slow down or harm network throughput. In one embodiment, the bot detection engine taps a network switch and receives a copy of the network data as received by the network switch for analysis. In some embodiments, the network communication flows between hosts inside or outside the network (e.g. received network traffic) are parsed into session datasets which may be stored as flow data structure for analysis. For example, in some embodiments, host 118 is communicating with host 116. First, host 118 generates a first communication flow dataset 304 (e.g. request, unidirectional data flow). Second, host 116 generates a second communication flow dataset 306 (e.g. response, unidirectional data flow). In some embodiments, by examining packet contents (e.g. data/information transmitted in the unidirectional data flows), such as source and destination addresses, the bot detection engine 106 may combine matching flows into a session dataset 302. However in some cases, a request (e.g. 304) is sent, but there is no reply (e.g. 306 does not occur). This may be because host 118 addressed its communications to a non-existent target, for example. Nonetheless, this communication may still be categorized a session dataset by the bot detection engine 106. After identifying and categorizing one or more flows into a session dataset (e.g. 302), the bot detection engine 106 may store the session data, unidirectional flow data, and other data, such as session identifying data, in a storage device 307.

Figure 4:
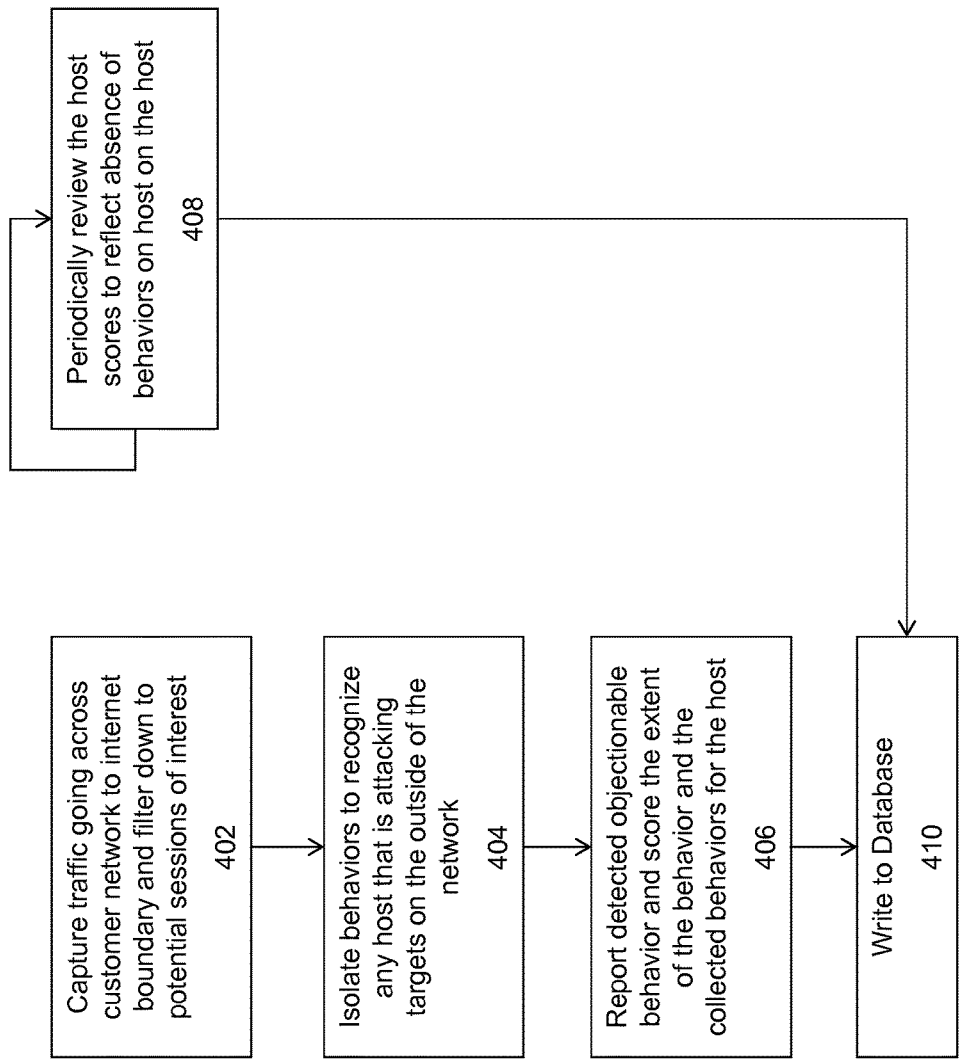
FIG. 4 shows a flowchart for an approach for detecting bot activity on a network.

FIG. 4 shows a flowchart for an approach for detecting bot activity on a network. In some embodiments, the bot detection engine 106 is connected to a network inside the firewall protecting the customer network. At 402, the detection system captures traffic going through the firewall and filters the traffic so that the data includes only session data of interest. In some embodiments, the session datasets of interest correspond to sessions initiated from hosts inside the customer network to IP (Internet Protocol) addresses external to the network (e.g. hosts in the Internet).

At 404, the system then performs analysis to detect various monetization behaviors, as according to some embodiments. This may be performed, for example, by inspecting session datasets for those sessions initiated by an internal host across small time periods (e.g. time windows of minutes, hours). In some embodiments, the session data sets are analyzed to detect network activity behavior that matches a signal that an individual internal host is contacting (e.g. attacking) one or more external targets using a specific behavior (e.g. click fraud, sending emails), which may correspond to potential actions a bot would perform. In some embodiments, potential bot actions correspond to clicking on a website advertisement, for instance as part of a pay-per-click advertising fraud or scheme. In some embodiments, potential bot actions correspond to sending one or more emails, for instance as part of a spamming scheme. In some embodiments, potential bot actions correspond to selecting a particular item from a prior executed search, for instance as part of a fraudulent search engine optimization (SEO) scheme. In some embodiments, potential bot actions correspond to creating or adding a new friend or follower in a social network. In some embodiments, potential bot actions correspond to attempting to access multiple IP addresses external to the network on the same protocol and port.

In some embodiments, the session datasets may be inspected over small time periods in a sliding window scheme. For example, if a time interval (e.g. a pre-selected time interval) for a sliding window is five minutes, then only data within the last five minutes is analyzed (e.g. data older than five minutes is discarded and/or not analyzed). In some embodiments, the time interval may be pre-selected to match different network security environments (e.g. the time interval may be customized, or optimized per network). Further, in some embodiments, certain IP addresses or host actions may be whitelisted such that they are not analyzed, even if they occurred (e.g. IP addresses contacted) within the sliding window. In this way, innocuous actions, such as multiple hosts contacting a trusted website, can be carved out of the analysis and the bot detection engine can be customized for different network activity behaviors or network patterns. In some embodiments, network patterns correspond to common actions (e.g. requested services, websites accessed) that are performed by hosts, in which the actions may be grouped by frequency.

At 406, as according to some embodiments, once data corresponding to attack behavior has been detected, the system may report the data as corresponding to a host and generate host score data that may be indicative that the host is a bot. As such, the host may be flagged as a potential bot. In some embodiments, scoring may also be performed regarding the extent of the identified behavior/intrusion.

In some embodiments, the persistent detection of one type of monetization behavior attributed to a bot/host increases the bot detection engine's certainty that the internal host is a bot. In some embodiments, the certainty corresponding to a positive identification of a bot is stored a data value (e.g. 60% confidence) in the bot detection engine. In some embodiments, the detection of smaller amounts of multiple different types of monetization behaviors by a single internal host over a number of hours or days increases the bot detection engine's certainty that the internal host is a bot. In some embodiments, the certainty corresponding to a positive identification of a bot is stored a data value (e.g. 60% confidence) in the bot detection engine.

At 408, as according to some embodiments, the bot detection engine may perform periodic review of the host scores and/or certainty scores. For example, the periodic reviews may be performed, to check the scores to ensure they reflect the absence/presence of newly detected certain behaviors on the hosts.

At 410, under the approach of either 402-406 or 408, the reported detection data can be stored a database that may be accessed by a user (e.g., within the IT department) as according to some embodiments. In this way, the IT department may review the bot-related activity data and may take appropriate action to address the intrusion. For example, the company IT staff may choose to fix the bot (e.g. by reinstalling the operating system on it), thereby converting the bot back into an uninfected host. In some embodiments, the bot detection engine may gradually "decay" the certainty that the host is a bot by noting the absence of monetization behaviors over a significant time period (usually hours to days). In this way, the IT staff does not have to alert or update host statuses in bot detection engine; instead the engine effectively updates itself by tracking monetization activity frequency and decaying certainty scores.

Figure 5:
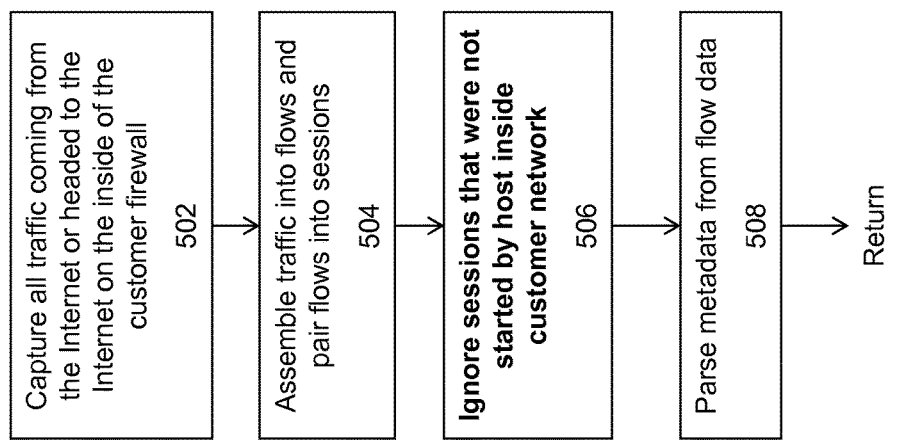
FIG. 5 shows a flowchart for an approach acquiring packets from the organization's network, organizing them into flows and sessions of interest, as according to some embodiments.

FIG. 5 shows a flowchart for an approach for acquiring packets from the organization's network, organizing them into flows and sessions of interest, as according to some embodiments. At 502, network packets may be received on one or more network interfaces that connect the bot detection system to the network. As explained, in some embodiments, the connection interface may be performed through use of a TAP/SPAN on a network switch. In some embodiments, when duplicate packets are found, they may be discarded to reduce data overhead.

At 504, the packets may be assigned to flows (e.g. 304, 306), which may be matched or paired into session datasets (e.g. 302). Depending on the protocols in use, a flow (e.g. 304) may be identified by a 5-tuple (source IP, destination IP, protocol identifier, source port, destination port) for UDP and TCP or a triple (source IP, destination IP, protocol identifier) for other protocols. As explained, flows may comprise unidirectional information paths wherein two flows traveling the same path in opposite directions may be considered a session. In some embodiments, packets may arrive out of order due to queuing issues in routers or due to the availability of multiple paths between source and destination. In these cases, the system places the packets in the order originally transmitted by the originating host of the flow.

At 506, as according to some embodiments, session data sets that correspond to communications that are not initiated by an inside host to an outside IP address may be discarded. In some embodiments, the packets are discarded to reduce data overhead that can result in unwanted noise in the analysis process. In some embodiments, the packets are discarded because some bot activity is always initiated by inside hosts (e.g. hosts in the network 112, etc.).

At 508, as according to some embodiments, now that the packets are in the correct order, parsers for higher-level protocols (such as HTTP and DNS) may be employed to identify sessions that carry the protocols and to extract the metadata (e.g. the contents of HTTP header fields, the domain name associated with the external entity in the session) for downstream monetization behavior detection schemes.

Figure 6:
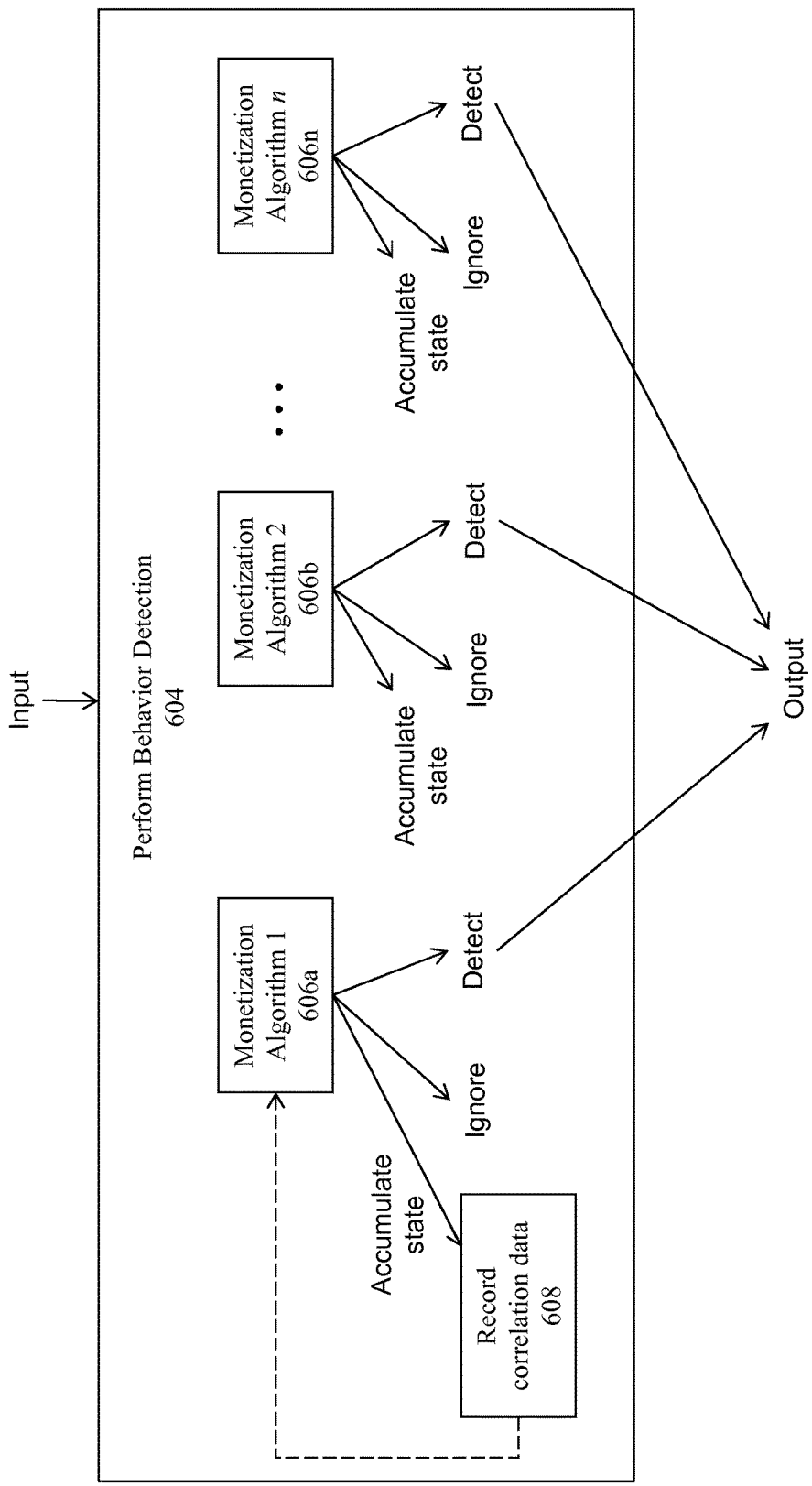
FIG. 6 illustrates an approach for detecting the bot behavior related activity, as according to some embodiments.

FIG. 6 illustrates an approach for detecting the bot behavior related activity, as according to some embodiments. In some embodiments, the bot detection engine comprises several pattern-based recognition schemes (e.g. 606a-n) that are designed to detect data corresponding to one or more monetization behaviors (e.g. sending spam emails, performing advertising click fraud). In some embodiments, the malicious behavior exhibited by monetization schemes is detected by analyzing multiple sessions from an internal host to external IP addresses over a short (e.g. minutes to hours) span of time. In some embodiments, the detection schemes process the sessions, and individually decide whether to ignore them (if they are not of interest), whether to accumulate state data about them (if they are of interest, but the threshold set for detection the behavior hasn't been reached) or to signal a detection (if the collected state indicates a monetization behavior). For example, if bot/host 112 contacts 20 attack targets (e.g. 112a-112n) within 10 minutes for click fraud purposes (e.g. clicking on advertisements placed on fake websites), clicking several ads per website, and the time window limit/threshold is 5 clicks per min, the bot detection engine may signal that the host 112 is in fact a bot, with high certainty. However, if bot/host 112 contacts, for example, 1 host every two minutes, then in 5 minutes bot/host 112 has not exceeded the example threshold. In this case, the bot detection system may continually accumulate state data (e.g. collect data corresponding to: continually track the number of events, continually track the number of events per time interval) until host/bot exceeds 5 clicks per minute; after the threshold is met, the bot detection engine may signal that host 112 is likely a bot as it appears to be partaking in bot activity.

In some embodiments, the bot detection engine may accumulate state across hosts or detection types. For example, if host 112, host 114, and host 116 contact attack target 112a (e.g. multiple hosts contact the same IP address, belonging to attack target 112a, as part of a DDOS attack) at the same point in time, the state accumulator for each host (e.g. 112, 114, and 116) may collect too few events to exceed an individual threshold. However, a state accumulator may be assigned per destination IP (e.g. attack target 112a) such that the collective actions of the hosts exceed the threshold, and each host is labeled as a potential bot.

In some embodiments, each detection scheme is designed to analyze certain types of session datasets. Some deal with sessions regardless of higher-level protocol, others look for specific types of sessions (e.g. ones carrying HTTP, DNS or other protocols). The monetization behavior detection scheme perform stateful processing 604 in the sense that they need to encounter multiple sessions attributed to a specific internal host in a certain window of time (minutes to hours) in order to decide whether the collection of sessions approximates the monetization behavior.

In some embodiments, the monetization behavior detection schemes 606a-n processes one session at a time and makes its a determination on whether to ignore the session (because it includes nothing of interest), whether to add to state which it is accumulating for a particular internal host or to report a monetization behavior detection related to an accumulated set of sessions for that host. In some embodiments, the monetization behavior detection schemes may accumulate short-term state 608 (often as little as 5 minutes, typically no more than an hour, though in extreme circumstances, up to 24 hours) as it is looking to detect sustained behavior of a particular kind by a particular internal host.

Figure 7:
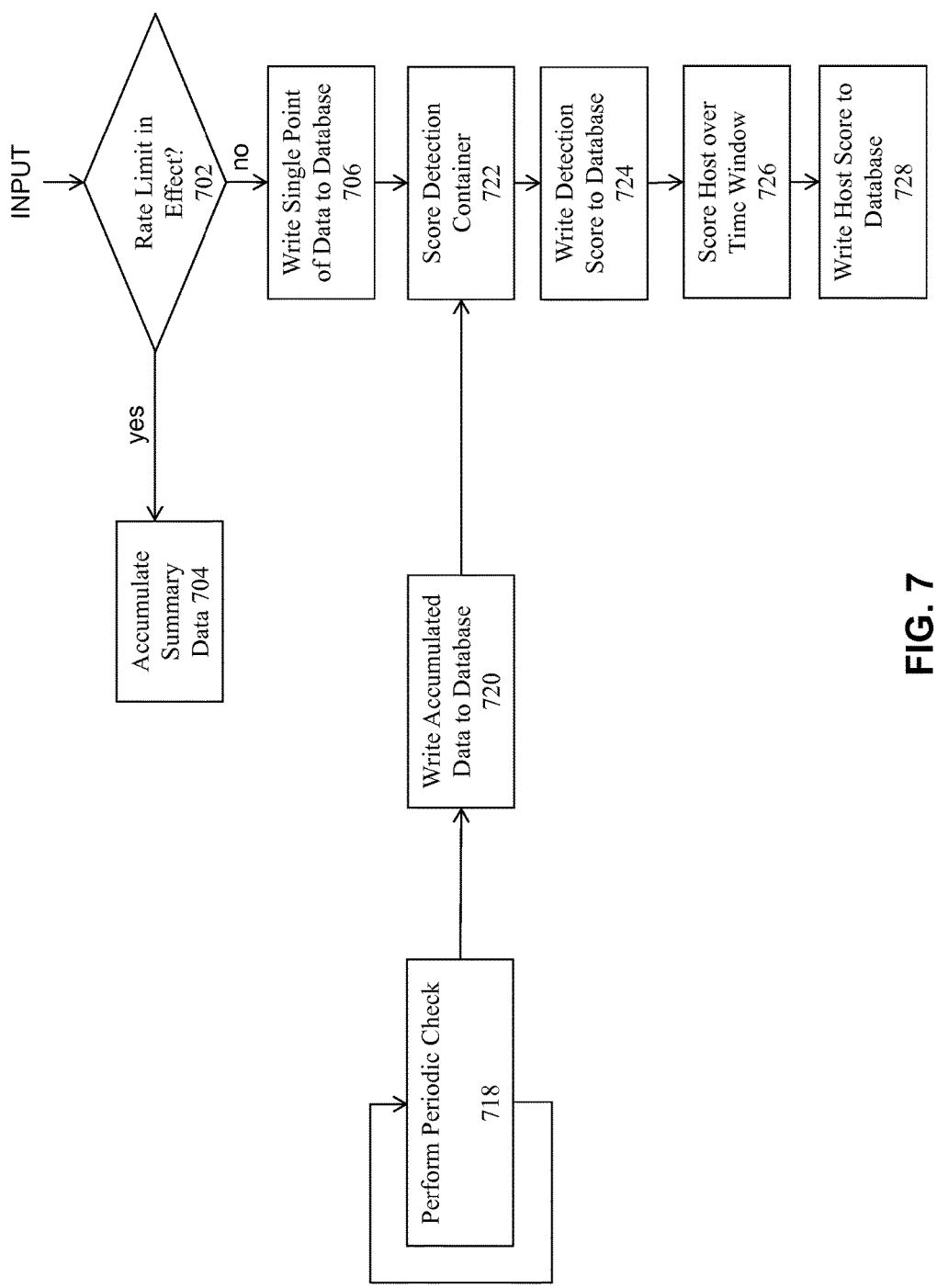
FIG. 7 illustrates reporting aspects of the bot detection engine, as according to some embodiments.

FIG. 7 illustrates reporting aspects of the bot detection engine, as according to some embodiments. In some embodiments, a scoring module controls how much information about the detections is ultimately written to the database and, thus, becomes visible to the IT security staff of the organization in which the system is deployed. In some embodiments, the three functions performed by these reporting parts of the system include data reduction, scoring and writing to the database.

In some embodiments, the input into the scoring module is the output of the detection modules described in FIG. 6. In some embodiments, reporting of monetization detection types may be rate-limited to prevent too much (e.g. unnecessary) information from being written to the database. At 702, a check is made whether a rate limit is in effect. In some embodiments, if there has not been a recent detection of this type for the affected host (e.g. a host that was previously infected and/or tracked), no rate limit is in effect. In this example case, at 506 the detections may be published and the current time (e.g. publish time) is retained as state in the rate limiter.

However, if there has been a recent detection of a type for a certain host, then rate limiting may be in effect. In this example case, at 704 the detections may be accumulated for later publishing. In some embodiments, what occurs in the accumulation logic depends on whether this is the first detection to arrive while the rate limit is in effect. If it is, the detection data is simply buffered. For each subsequent detection which is made while the rate limit is in effect, information from the newly arrived detection may be combined into the detection data already being accumulated;

thus resulting in a single "reduced" detection data set being buffered by the rate limiter for each detection type for each host.

In some embodiments, to ultimately flush accumulated information, a periodic check may be performed at 718 to see if any accumulated data has been held back for long enough. If it has, the data may then be written to the database. In this case, the time at which the data is published is retained in the rate limiter to ensure the rate limit remains in effect for the next set of detections. At 720, information contained in either a single or a combined set of accumulated detections is published to the database.

In some embodiments, the detection data (e.g. single detection data or accumulated data) that has been published to the database may be scored in conjunction with all the other recent detections of the same detection type for the same host 722. In this way, the system may score the monetization behavior type for a host at a given point in time based on the recently received monetization behavior detection instances of the same type. A certainty score (e.g. the certainty of detection of the observed behavior) and threat score (e.g. the threatening nature of the behavior) may then be calculated and the scores are written to the database at 724.

Next, as according to some embodiments, the accumulation of monetization behavior data corresponding to an internal host may be considered in determining a certainty score (e.g. the likelihood that the host is a bot) and threat score (e.g. the business impact that the accumulated set of behaviors represent) at 726. The host's scores take into account the certainty score data and threat score data of the individual monetization behavior detections reported against the host and the last time each detected behavior was reported. The calculated host score may then be written to the database at 728. An example approach that can be taken to generate certainty score data and threat score data is described in U.S. patent application Ser. No. 14/644,166, entitled "A system and method for detecting network intrusions using layered host scoring", filed on even date herewith, which is hereby incorporated by reference in its entirety.

Figure 8:
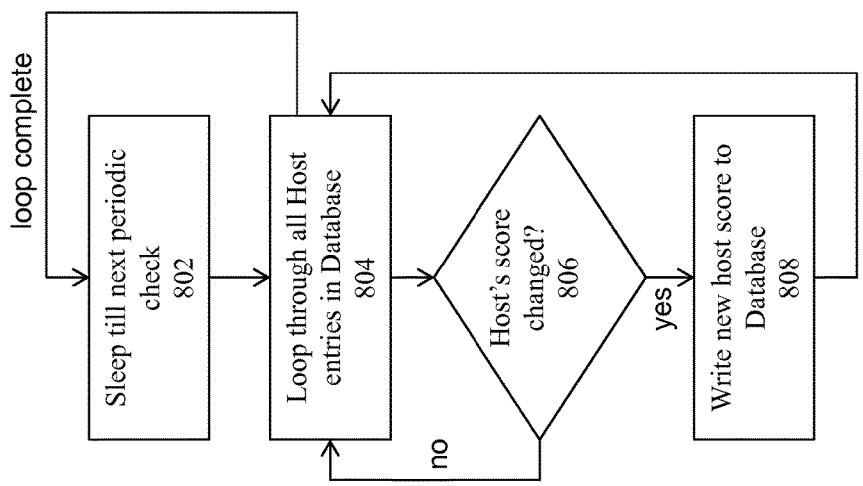
FIG. 8 shows a flowchart for an approach for adjusting host scores when monetization behaviors are absent, as according to some embodiments.

FIG. 8 shows a flowchart for an approach for adjusting host scores when monetary behaviors are absent, as according to some embodiments. Generally, it is preferred that host threat score data and certainty score data reflect not just the arrival of new monetization behavior detections, but also reflect the absence of previously seen behavior. To address this feature, a periodic check for a time interval (e.g. every five minutes, hourly, monthly) may be performed at 802 to determine whether each host's score should be modified or adjusted as a result of the passage of time and the absence of detected monetization behaviors. In some embodiments, the time interval for periodic checks may be pre-selected and/or customized per implementation. In some embodiments, such as a high-security environments (e.g. a bank system's network), the pre-selected time interval may be set to relatively small time intervals (e.g. 10 minutes, 1 day) so that the periodic checks occur frequently.

In some embodiments, at 804, the bot detection engine 106 may loop through a list of internal hosts for which it has accumulated data that indicates the hosts are bots and will calculate a host's current score. In some embodiments, the host's score may reflect observed behavior over a variable window of time. In some embodiments, each type of monetization behavior is observed in its own unique time window with custom time and threshold parameters. In this way, as time passes the data corresponding to the accumulated detections may effectively "decay" or attenuate in value over time, and eventually may be removed from the score data. In some embodiments, the host score's value decays or attenuates with time. In some embodiments, the detection values decay or attenuate in time, which may contribute to host score value's decaying or attenuating in time. In some embodiments, the decay may be dictated by a decay rate (e.g. a linear rate).

In some embodiments, if a host's score has not changed, the bot detection engine may iterate to the next host at 806. However, if the score has changed, the new host score may be written to the database at 608.

Therefore, what has been described is an improved system, method, and computer program product for performing intrusion detections.

System Architecture Overview

Figure 9:
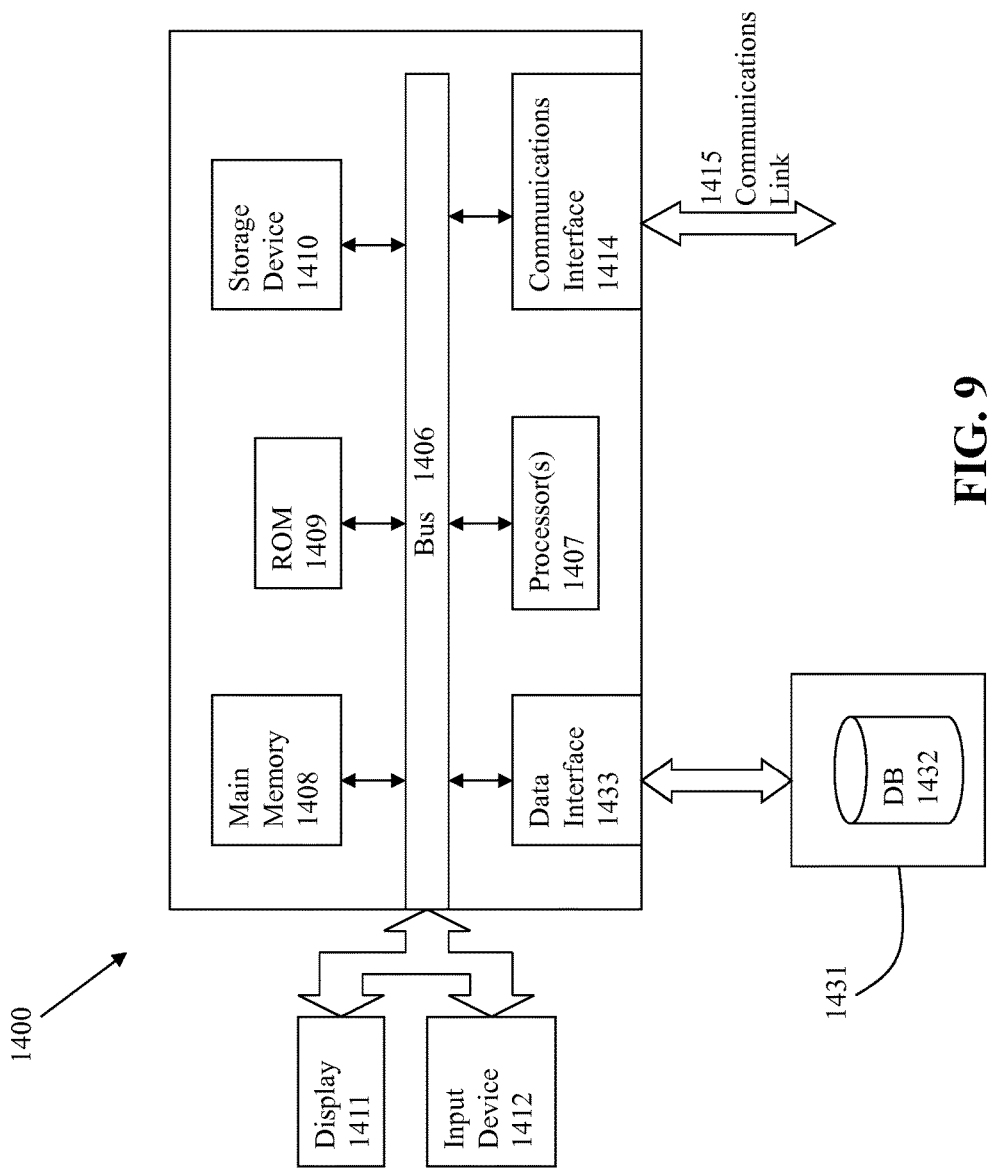
FIG. 9 is a block diagram of an illustrative computing system 1400 suitable for implementing an embodiment of the present invention for performing intrusion detection

FIG. 9 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting bot behavior on networks, comprising:
    generating one or more session datasets, the session datasets corresponding to received network traffic from one or more hosts in a network;
    discarding session datasets that correspond to network traffic not initiated by one or more hosts in the network; and
    determining whether one or more of the hosts in the network is performing network attacks on targets outside of the network by:
        accumulating a number of actions performed by the one or more hosts into a database by continually tracking a number of events per time interval, the actions corresponding to one or more potential bot actions performed by the one or more hosts contacting one or more external hosts per the time interval as indicated by data in the network traffic, wherein the one or more potential bot actions correspond to: clicking on a website advertisement, sending one or more emails, selecting a particular item from a prior executed search, creating a new friend or follower in a social network, or attempting to access multiple IP addresses external to the network on a same protocol and port;
        discarding actions older than a pre-selected time interval limit; and
        determining whether the number of actions per the time interval surpasses a threshold corresponding to the one or more potential bot actions per the time interval, and if the number of actions per the time interval surpasses the threshold then generating host score data, wherein the host score data corresponds to an indication of whether one or more of the hosts is a bot or whether one or more of the hosts is partaking in bot activity corresponding to network attacks and a most recent time an individual potential bot action was reported.

2. The method of claim 1, wherein the host score data corresponds to threat score data and certainty score data, the threat score data and certainty score data corresponding to an individual potential bot action.

3. The method of claim 2, wherein a value of the host score data attenuates with time.

4. The method of claim 3, wherein an attenuation is dictated by a decay rate.

5. The method of claim 1, wherein the host scores for the one or more hosts are periodically updated.

6. The method of claim 1, wherein the action corresponds to multiple hosts repeatedly accessing a same IP address external to the network.

7. The method of claim 1, wherein the network traffic is received passively through a network switch.

8. A computer program product embodied on a non-transitory computer readable medium, the non-transitory computer readable medium having stored thereon a sequence of instructions which, when executed by a processor causes the processor to execute a method for accessing data corresponding to detecting bot behavior on networks, comprising:
    generating one or more session datasets, the session datasets corresponding to received network traffic from one or more hosts in a network;
    discarding session datasets that correspond to network traffic not initiated by one or more hosts in the network; and
    determining whether one or more of the hosts in the network is performing network attacks on targets outside of the network by:
        accumulating a number of actions performed by the one or more hosts into a database by continually tracking a number of events per time interval, the actions corresponding to one or more potential bot actions performed by the one or more hosts contacting one or more external hosts per the time interval as indicated by data in the network traffic, wherein the one or more potential bot actions correspond to: clicking on a website advertisement, sending one or more emails, selecting a particular item from a prior executed search, creating a new friend or follower in a social network, or attempting to access multiple IP addresses external to the network on a same protocol and port;
        discarding actions older than a pre-selected time interval limit; and
        determining whether the number of actions per the time interval surpasses a threshold corresponding to the one or more potential bot actions per the time interval, and if the number of actions per the time interval surpasses the threshold then generating host score data, wherein the host score data corresponds to an indication of whether one or more of the hosts is a bot or whether one or more of the hosts is partaking in bot activity corresponding to network attacks and a most recent time an individual potential bot action was reported.

9. The computer program product of claim 8, wherein the host score data corresponds to threat score data and certainty score data, the threat score data and certainty score data corresponding to an individual potential bot action.

10. The computer program product of claim 9, wherein a value of the host score data attenuates with time.

11. The computer program product of claim 10, wherein an attenuation is dictated by a decay rate.

12. The computer program product of claim 8, wherein the host scores for the one or more hosts are periodically updated.

13. The computer program product of claim 8, wherein the action corresponds to multiple hosts repeatedly accessing a same IP address external to the network.

14. The computer program product of claim 8, wherein the network traffic is received passively through a network switch.

15. A system for detecting bot behavior on networks, comprising:

a computer processor to execute a set of program code instructions;

a memory to hold the program code instructions, in which the program code instructions comprises program code to perform:

generating one or more session datasets, the session datasets corresponding to received network traffic from one or more hosts in a network;

discarding session datasets that correspond to network traffic not initiated by one or more hosts in the network; and determining whether one or more of the hosts in the network is performing network attacks on targets outside of the network by:

accumulating a number of actions performed by the one or more hosts into a database by continually tracking a number of events per time interval, the actions corresponding to one or more potential bot actions performed by the one or more hosts contacting one or more external hosts per the time interval as indicated by data in the network traffic, wherein the one or more potential bot actions correspond to: clicking on a website advertisement, sending one or more emails, selecting a particular item from a prior executed search, creating a new friend or follower in a social network, or attempting to access multiple IP addresses external to the network on a same protocol and port;

discarding actions older than a pre-selected time interval limit; and determining whether the number of actions per the time interval surpasses a threshold corresponding to the one or more potential bot actions per the time interval, and if the number of actions per the time interval surpasses the threshold then generating host score data, wherein the host score data corresponds to an indication of whether one or more of the hosts is a bot or whether one or more of the hosts is partaking in bot activity corresponding to network attacks and a most recent time an individual potential bot action was reported.

16. The system of claim 15, wherein the host score data corresponds to threat score data and certainty score data, the threat score data and certainty score data corresponding to an individual potential bot action.

17. The system of claim 16, wherein a value of the host score data attenuates with time.

18. The system of claim 17, wherein an attenuation is dictated by a decay rate.

19. The system of claim 15, wherein the host scores for the one or more hosts are periodically updated.

20. The system of claim 15, wherein the action corresponds to multiple hosts repeatedly accessing a same IP address external to the network.

21. The system of claim 15, wherein the network traffic is received passively through a network switch.

* * * * *